United States Patent [19]

Wiersema et al.

[11] Patent Number: 4,621,850
[45] Date of Patent: Nov. 11, 1986

[54] COIL REMOVAL APPARATUS FOR A DYNAMOELECTRIC GENERATOR

[75] Inventors: Dale T. Wiersema, Bellevue; Fred Kirschensteiner, Forest Hills, both of Pa.

[73] Assignee: Westinghouse Electric Corp., Pittsburgh, Pa.

[21] Appl. No.: 749,024

[22] Filed: Jun. 26, 1985

[51] Int. Cl.$^4$ .................... B23P 19/04; B66C 1/48
[52] U.S. Cl. .................... 294/81.61; 29/762; 294/81.2; 294/106
[58] Field of Search ............... 294/81.1–81.3, 294/81.5, 81.51, 81.56, 81.6–81.62, 85, 87.1, 101, 106, 114, 118, 132–134, 902; 29/281.1, 426.5, 762

[56] References Cited

U.S. PATENT DOCUMENTS

| | | | |
|---|---|---|---|
| 2,229,800 | 1/1941 | Dean | 294/114 X |
| 2,412,555 | 12/1946 | Baker | 294/81.61 X |
| 2,512,370 | 6/1950 | O'Donnel et al. | 29/762 |
| 3,010,191 | 11/1961 | McCullough | 29/762 |
| 4,221,419 | 9/1980 | Riley et al. | 294/106 |

FOREIGN PATENT DOCUMENTS

| | | | |
|---|---|---|---|
| 2419708 | 10/1975 | Fed. Rep. of Germany | 294/81.61 |
| 404753 | 10/1973 | U.S.S.R. | 294/81.6 |
| 614001 | 7/1978 | U.S.S.R. | 294/81.5 |
| 819038 | 4/1981 | U.S.S.R. | 294/81.6 |

Primary Examiner—Johnny D. Cherry
Attorney, Agent, or Firm—R. S. Lombard

[57] ABSTRACT

A coil removal apparatus for a dynamoelectric generator. This apparatus directs a radial pulling force on the legs of a coil to be removed from stator core slots during rewinding operations. The apparatus includes a frame including a frame member of predetermined length. A pair of gripper members are provided with grippers jaws to grasp each leg of a coil to be removed. The gripper members are connected to the frame member. The frame member is connected to a pulling mechanism that applies a horizontal force to the frame member to pull the coil out of the slots without binding in the slots.

13 Claims, 7 Drawing Figures

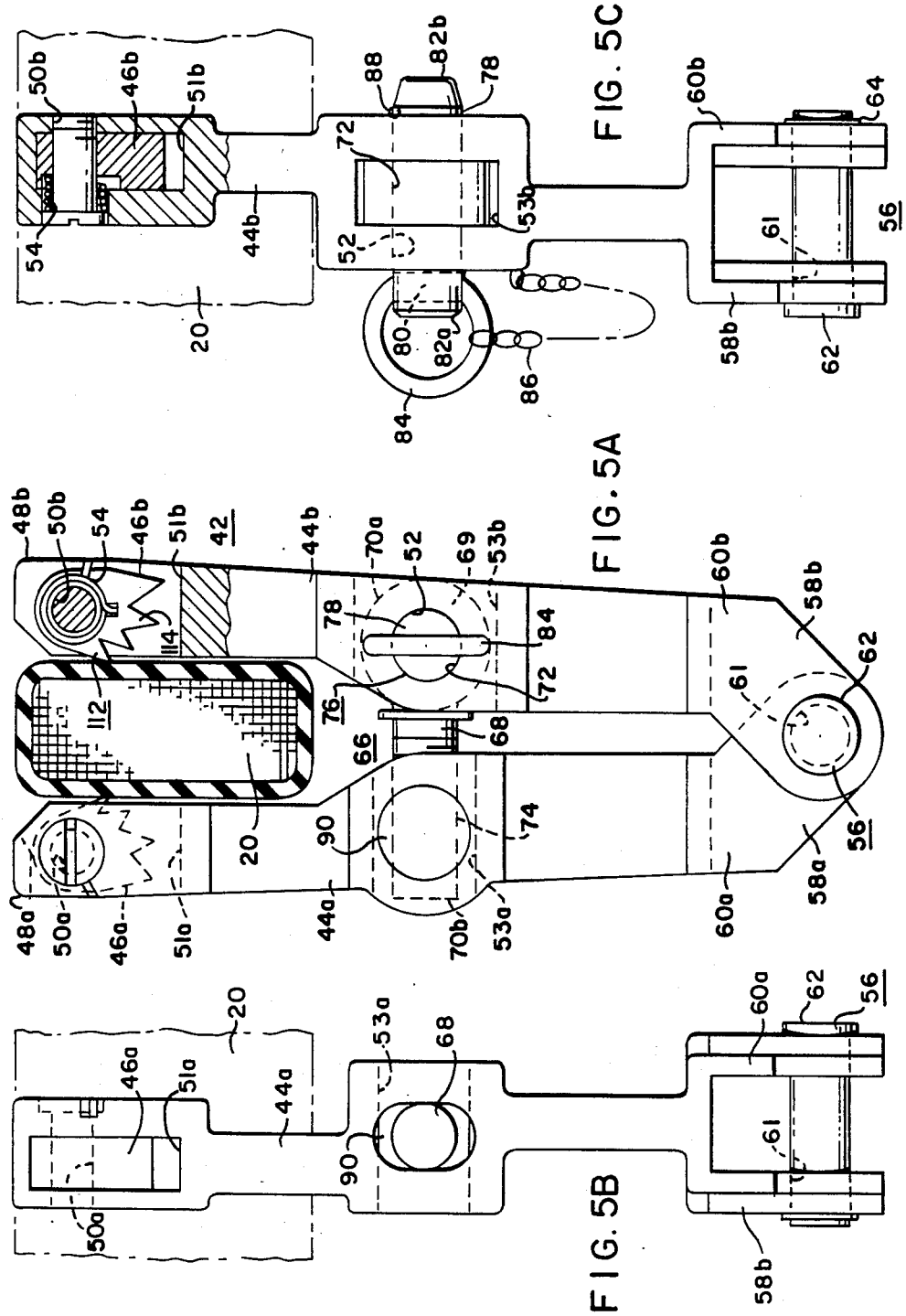

COIL REMOVAL APPARATUS FOR A DYNAMOELECTRIC GENERATOR

BACKGROUND OF THE INVENTION

This invention relates to dynamoelectric generators, and in particular, to a coil removal apparatus for a dynamoelectric generator. The field rewinding of hydrogenerators, in particular, requires removal of the old coils and replacement with new coils. The old coils are often very difficult to remove from the stator core slots. Typically, an overhead crane and pulley arrangement are used to extract these coils from the stator core. The pulley changes the direction of the pull of the crane from vertical to horizontal and is mounted near the center of the core for radial pull direction. In the past a sling has been used for the coil pulling operation. Each end of the sling is attached to one leg of the coil and the sling is pulled at the center with a crane cable. This arrangement has the tendency to draw the two legs of the coil together rather than directly out of the slot resulting in binding of the coil in the slots, making it even more difficult to extract.

SUMMARY OF THE INVENTION

The present invention overcomes the difficulties associated with the prior art coil removal system. The present invention discloses a coil means removal apparatus for a dynamoelectric generator, such as a hydroelectric generator. Such a generator typically has a stator core having a plurality of vertical slots therein around the inner periphery of the core, as is known in the art. Coil means including a plurality of coils of predetermined size and shape are included. Each of the coils include a plurality of thin elongated metallic conductors. Each of the coils has two legs. A portion of each of the coil legs is maintained in position in one of the slots.

The apparatus comprises frame means including an elongated frame member of predetermined length. The frame member has mounted thereon a slidable cable connector means. The slidable cable connector means includes a pair of slidable cable connectors. Each of the cable connectors has a cable retaining means on opposite sides thereof.

The apparatus further comprises gripper jaw member means including a pair of gripper jaw arms. Each of the gripper jaw arms includes a pair of rotating gripper jaws. A first of the gripper jaws is mounted proximate one end of a first of the gripper arms. A second of the gripper jaws is mounted proximate one end of a second of the gripper jaw arms. Torsion means is included for engaging each of the gripper jaws. The torsion means is mounted on each of the arms in working engagement with the jaws. A hinge means rotatably hinges the first and second gripper arms together at the other ends thereof. Gripper arm adjustment means is included for adjusting the distance between the first and second rotating gripper jaws. Quick release pin means is also included for quickly releasing the adjustment means thereby disengaging the gripper jaws from a coil being pulled.

The apparatus further comprises first connector means for connecting the gripper jaw member means to the slidable cable connectors. A second connector means is included, the first ends of which are connected to the first and second slidable cable connector. A means first ring member is included for engagement with the other ends of the second connector means. A horizontal pulling means is included for pulling on the first ring member, whereby when the gripper jaws are positioned to contact a coil to be removed from the slots at a position above the slots, each of the jaws clamp on one of the coil legs and the apparatus applies a radial pulling force to the coil to avoid binding of the coil in the slots to pull the coil out of the slots. When the coil is out of the slots, the quick release pin means is pulled to release the coil from the gripper jaws. Preferably, the gripper arm adjustment means includes an adjustment bolt means. The adjustment bolt means has first and second end portions. The adjustment bolt means has an eyelet portion at the first end portion thereof having an opening therethrough and a threading means at the second end portion thereof. Preferably, the first and second gripper jaw arms have first aperture means therethrough in predetermined position. The first and second gripper jaw arms have first channels therein in predetermined position. The gripper jaws are mounted in the first channels. The second gripper jaw arm has a second aperture therethrough in predetermined position. The first and second jaw arms preferably also have second channels therein in predetermined position.

Preferably, the quick release pin means includes an elongated pin member of predetermined diameter and length. The pin member has a diameter smaller than the second aperture of the second jaw arm and the opening of the eyelet portion of the adjustment bolt means. Receptacle means is mounted in the second channel of the first jaw arm. The receptacle means is for receiving the threading of the adjustable bolt member. The second end portion of the adjustable bolt member is for insertion into the second channel of the second jaw arm. The second aperture and the second channel are aligned such that when the quick release pin is inserted in the second aperture of the second jaw arm, it engages the opening of the eyelet portion of the adjustable bolt means which is positioned in the second channel of the second jaw arm. Other features of the invention are also disclosed.

BRIEF DESCRIPTION OF THE DRAWINGS

For a better understanding of the invention reference may be had to the accompanying drawings in which:

FIG. 5A is a plan view of a gripper jaw member in engagement with a coil;

FIG. 5B is a left-side elevational view of the gripper jaw member shown in FIG. 5A; and FIG. 5C is a right-side elevational view of the gripper jaw member shown in FIG. 5A.

DESCRIPTION OF THE PREFERRED EMBODIMENTS

Figure 3:
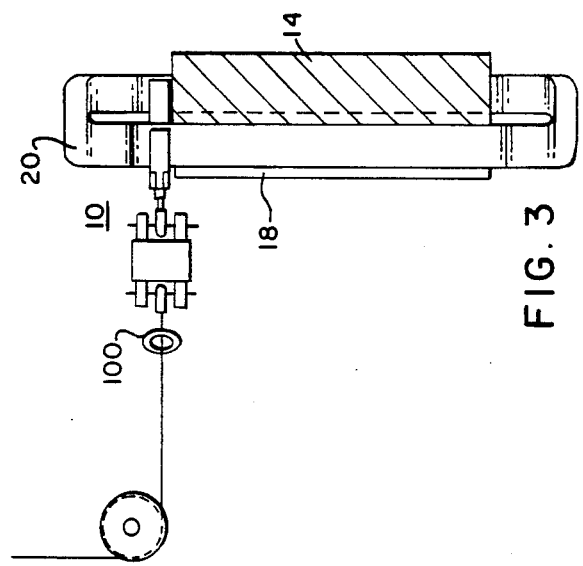
FIG. 3 is a side-elevational view of a section of the stator core taken along the line A—A of FIG. 1 showing the coil means removal apparatus in position to remove a coil from the stator core.
Figure 2:
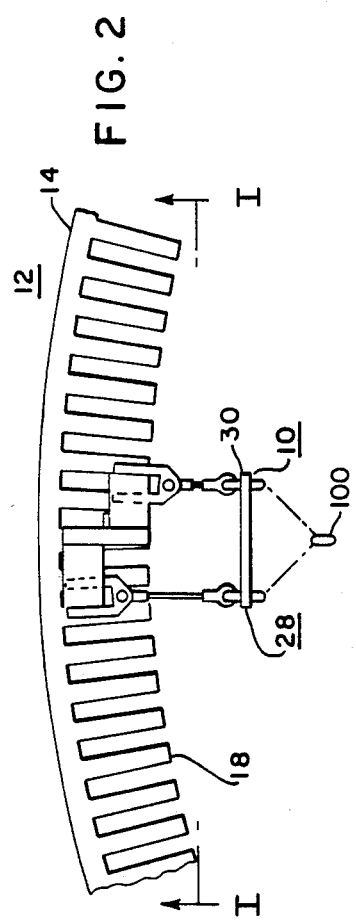
FIG. 2 is a plan view of a section of the stator core showing the coil means removal apparatus in position to remove a coil from the stator core.
Figure 1:
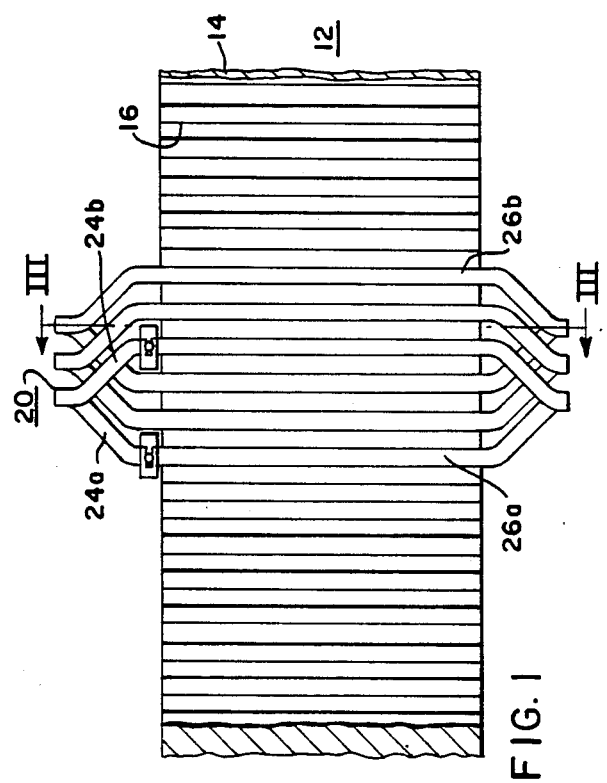
FIG. 1 is a sectional elevational view of the stator core showing the position of the coil means removal apparatus with respect to a coil to be removed.
Figure 4:
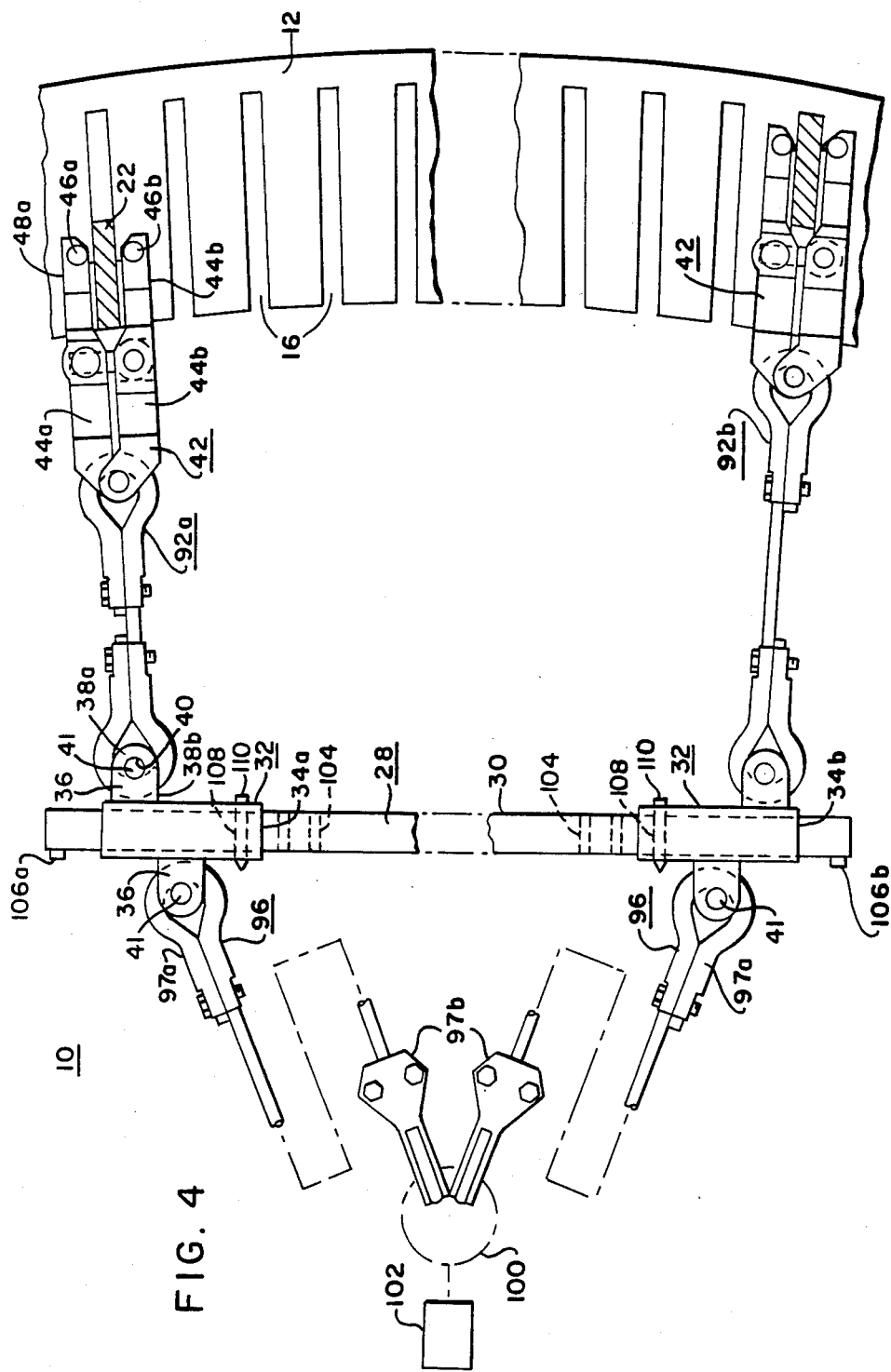
FIG. 4 is an enlarged plan view of the coil removal apparatus in engagement with a coil to be removed.

With reference to FIGS. 1–3, there is shown a coil means removal apparatus for a dynamoelectric generator 12, such as a hydroelectric generator. The generator 12 has a stator core 14, as is known in the art. The stator core 14 has a plurality of vertical slots 16 therein around the inner periphery 18 of the core 14 and a plurality of coils 20 of predetermined size and shape, such as having a height of 10' and a shape such as shown in FIG. 1. Each of the coils 20 includes a plurality of thin elongated metallic conductors 22 as shown in FIG. 4 as is known in the art. Each of the coils 20 have two legs 24a, 24b. A portion 26a, 26b of each of the coil legs 24a, 24b is maintained in position in one of the slots 16 as shown in FIG. 1.

The coil removal apparatus 10 comprises a frame means 28, as shown in FIG. 4, including an elongated frame member 30 of predetermined length, such as 28". The frame member 30 may be hollow having a 1.25" square cross section and a wall thickness of 0.120", for example. Slidable cable connector means 32 are mounted on the frame member 30 as shown in FIG. 4. The slidable cable connector means 32 includes a pair of slidable cable connectors 34a, 34b. Each of the cable connectors 34a, 34b has cable retaining means 36 affixed to opposite sides thereof as shown in FIG. 4. The cable retaining means 36 preferably has upper and lower flange members 38a, 38b. The upper and lower flange members 38a, 38b have a first opening 40 therethrough, having second pin member 41 passing therethrough.

Gripper jaw member means 42 includes a pair of gripper jaw arms 44a, 44b as shown in FIG. 4, 5a–5c. Each of the gripper jaw members 42 includes a pair of rotating gripper jaws 46a, 46b. A first of the gripper jaws 46a is mounted proximate one end 48a of a first of the gripper arms 44a, as shown in FIGS. 5A–5C. A second of the gripper jaws 46b is mounted proximate one end 48b of a second of the gripper jaw arms 44b as shown in FIG. 5A. Preferably the first gripper jaw arm 44a and the second gripper jaw arm 44b have first aperture means 50a, 50b, respectively, therethrough is predetermined position such as shown in FIG. 5A. The second gripper jaw arm 44b has a second aperture means 52 therethrough in predetermined position as shown in FIG. 5A. The first jaw arm 44a and the second jaw arm 44b have a first channel 51a, 51b, respectively, therein in predetermined position. The gripper jaws 46a, 46b are mounted in the first channel 51a, 51b. The first jaw arm 44a and the second jaw arm 44b preferably have second channels 53a, 53b, respectively, therein in predetermined position. Torsion means 54 is included for engaging each of the gripper jaws 46a, 46b. The torsion means 54 preferably comprises a helical spring. Torsion means 54 for rotating gripper jaw 46a is preferably a left-hand spring such as Model No. LT-045H-4L, Lee Spring Company, Brooklyn, NY, having a wire diameter of 0.045 inches and a 180° free-hand position with 2.15 inch pounds of torque. Torsion means 54 for rotating gripper jaw 46b is preferably a right-hand spring Model LT-045H-4-R of the same specifications as the left-hand spring. The torsion means 54 is mounted on each of the arms 44a, 44b in working engagement with the jaws 46a, 46b in first and second apertures 50a, 50b as shown in FIGS. 5a–5c. The torsion means 54 tends to rotate the jaws 46a, 46b inwardly toward each other.

Hinge means 56 rotatably hinges the first and second gripper arms 44a, 44b together at the other ends 58a, 58b thereof. Ends 58a, 58b form a U-shaped portion 60a, 60b which may be offset from the rest of the arms 44a, 44b as shown in FIGS. 5A–5C. Preferably, one of the U-shaped portions 60a is operably insertable in the other U-shaped portion 60b as shown in FIG. 5C. Preferably, the other ends 58a, 58b of the gripper arms 44a, 44b have third aperture means 61 therethrough of predetermined dimensions such as 0.627". The hinge means 56 comprises a pin member 62 such as shown in FIG. 5C, which operably engages the third aperture 61. Retaining ring 64 engages the first pin member 62 as shown in FIG. 5C. The retaining ring may be that such as manufactured by Waldes Truare Div., Long Island City, N.Y., Model No. 5100-62. The hinge means 56 is of a diameter smaller than the diameter of the third aperture 61 permitting the arms 44a, 44b to rotate thereon. The diameter of the hinge means may be 0.625 inches, for example.

Gripper arm adjustment means 66 is included for adjusting the distance between the first and second rotating gripper jaws 46a, 46b as desired. The gripper arm adjustment means 66 preferably includes an adjustment bolt means 68 as shown in FIG. 5A. The adjustment bolt means 68 has a first end portion 70a and a second end portion 70b. The adjustment bolt means 68 has an eyelet portion 69 having opening 72 therethrough. The adjustment bolt means 68 has threading means 74 at the second end portion 70b thereof. The gripper adjustment means 66 further preferably includes a quick-release pin means 76 for quickly releasing the adjustment bolt means 68. The quick release pin means 76 preferably includes an elongated pin member 78 of predetermined diameter and grip length such as 0.625" and 1.5". The pin member 78 has a diameter smaller than the second aperture 52 of the second jaw arm 44b and the opening 72 of the eyelet portion 69 of the adjustment bolt 68. Preferably, the pin member 78 has a fourth aperture 80 at one end 82a, thereof. A ring member 84 passes through said fourth aperture 80 as shown in FIG. 5C. The ring member 84 facilitates ease in pulling of the pin 78 from the adjustment bolt 68 to permit release of the gripper jaws 46a, 46b when they are engaged in contact with a coil 20 and also maintains the pin 78 in the second aperture 52. Also preferably included is a chain 86 to prevent loss of the pin member 78. The other end 82b of the pin member 78 has a spring-loaded ball member 88 mounted thereon. The pin member 78 shown is a standard item, such as manufactured by McMaster-Carr Company, Model No. 98320A615. The ball member 88 prevents the pin from falling out when the gripper jaw members are in use. Receptacle means 90 for receiving the threading means 74 of the adjustment bolt member 68 is included. The receptacle means 90 is mounted in the second channel 53a of the first gripper jaw arm 44a. The quick release pin 78 engages the opening 72 of the eyelet portion 69 of the adjustment bolt means 68 as shown in FIGS. 5A and 5C.

The apparatus 10 also comprises first connector means 92a, 92b connecting gripper jaw members 42a, 42b to the slidable connectors 34a, 34b, respectively, as shown in FIG. 4. The first connectors 92a, 92b preferably are held in place by pin 41 at the cable retaining means 36. The first connector means 92a, 92b may include a wire rope such as manufactured by McMaster-Carr, No. 3440T18, 0.38 inches in diameter and combination wire rope "thimble clamps" as manufactured by McMaster-Carr, No. 3467T19. Second connector means 96 has ends 97a connected respectively to slidable connectors 34a, 34b. Ends 97a are preferably held in place by pin 41. The other ends 97b of second connector means 96 engage a second ring member 100 which may be an alloy steel pear link 0.75 inch stock diameter as manufactured by McMaster-Carr No. 3570T15. A horizontal pulling means 102 is shown schematically in FIG. 3 and may be a crane and pulley arrangement such that a horizontal pulling force is applied to the second ring member 100.

Utilizing the present invention, when the gripper jaw members 42a, 42b are positioned to contact a coil 20 to be removed from the slot 16, each of the jaws 46a, 46b clamps on one of the coil legs 24a, 24b. The apparatus to applies a radial pulling force to the coil 20 to avoid binding of the coil 20 in the slots 16 to pull the coil 20 out of the slots 16. When the coil 20 is out of the slots, the quick-release pin member 76 is pulled to release the coil from the gripper jaws 46a, 46b.

Preferably, the frame means 28 has first perforation means 104 therethrough in predetermined position such as shown in FIG. 4. Also preferably the frame means includes stops 106a, 106b to prevent the slidable connectors from sliding off the frame means. Also the slidable connectors are preferably provided with second perforations 108 therethrough in predetermined position as shown in FIG. 4. Preferably, the slidable connectors 34a, 34b include first pin means 110 of predetermined length and diameter such as 1.80" and 0.25" for engaging the second perforations 108 of the slidable connectors 34a, 34b and the first perforations 104 of the frame means 28 for securing the slidable connectors 34a, 34b in position as desired by aligning the slidable connectors in substantial radial alignment with said slots 16 containing the coil 20 to be removed. As shown in FIG. 4, a typical generator 12 has an inside diameter of 400 inches, for example, containing 524 coils. Each coil has a throw of 1 to 11 which means that one of the legs 24a will be in one of the slots 16 and the other leg 24b will be in a slot 16 ten slots from the first leg 24a. For this size generator, a frame means 28 has a length of at least 28" for example.

Each of the gripper jaws preferably has a coil contact portion 112 such as shown in FIG. 5A. The coil contact portion 112 includes a plurality of teeth 114 for firmly gripping the coil 20 when a pulling force is applied to the jaw member means 42. With the coil contact portion 112 of the gripper jaws 46a, 46b configured as shown in FIG. 5A, the gripper jaws utilizing a cam-type action exert an increasing force against a pulling force exerted on the coil 20 thus permitting the jaw members 42a, 42b to have a firm hold on the coil 20 to prevent slippage during pulling.

We claim:

1. A coil removal apparatus for a dynamoelectric generator, said generator having a stator core, said stator core having a plurality of vertical slots therein around the inner periphery of said core, a plurality of coils of predetermined size and shape, each of said coils including a plurality of thin elongated metallic conductors, each of said coils having two legs, a portion of each of said legs maintained in position in one of said slots, said apparatus comprising:
    (a) frame means including an elongated frame member of predetermined length, said frame member having mounted thereon slidable cable connector means, said slidable cable connector means having cable retaining means affixed to opposite sides thereof;
    (b) gripper jaw member means including a pair of gripper jaw arms, each of said gripper jaw arms including a pair of rotating gripper jaws, a first of said gripper jaws mounted proximate one end of a first of said gripper jaw arms, a second of said gripper jaws mounted proximate one end of a second of said gripper jaw arms, torsion means for engaging each of said gripper jaws, said torsion means mounted on each of said arms in working engagement with said jaws, a hinge means rotatably hinging said first and second gripper arms together at the other ends thereof, gripper arm adjustment means for adjusting the distance between said first and second gripper jaws, quick release pin means for quickly releasing said adjustment means;
    (c) first connector means for connecting said gripper jaw member means to said slidable cable connector means;
    (c) second connector means, the first ends of which are connected to said slidable cable connector means, a first ring member is included for engagement with the other ends of said second connector means;
    (e) a horizontal pulling means is included for pulling said first ring member, whereby when said gripper jaw member means are positioned to contact a coil to be removed from said slots, each of said jaws clamp on one of said coil legs and said apparatus applies a radial pulling force to said coil to avoid binding of said coil in said slots to pull said coil out of said slots, and when said coil is out of said slots, said quick release pin means is pulled to release said coil from said gripper jaws.

2. The apparatus of claim 1, wherein said frame means has first perforation means therethrough in predetermined position.

3. The apparatus of claim 2, wherein said slidable cable connector means has second perforation means therethrough in predetermined position.

4. The apparatus of claim 3, wherein said slidable cable connector means includes first pin means of predetermined length and diameter for engaging said second perforation means of said slidable cable connector means and said first perforation means of said frame means for securing said slidable cable connector means in position as desired by aligning said slidable cable connector means in substantial radial alignment with said slots containing the coil to be removed.

5. The apparatus of claim 1, wherein said first gripper jaw arm and said second gripper jaw arm each have first aperture means therethrough in predetermined position.

6. The apparatus of claim 5, wherein said first gripper jaw arm and said second gripper jaw arm each have first channels therethrough in predetermined position.

7. The apparatus of claim 6, wherein said first gripper jaw arm and said second gripper jaw arm each have a second channel therethrough in predetermined position.

8. The apparatus of claim 7, wherein said second gripper jaw arm has second aperture means therethrough in predetermined position.

9. The apparatus of claim 8, wherein said other ends of said gripper arms have third aperture means therethrough of predetermined dimensions.

10. The apparatus of claim 8, wherein said gripper arm adjustment means includes an adjustment bolt means, said adjustment bolt means has a first end portion and a second end portion, said adjustment bolt means having an eyelet portion at said first end portion thereof having an opening therethrough, said adjustment bolt means having threading means at said second end portion thereof.

11. The apparatus of claim 10, wherein said quick-release pin means includes an elongated pin member of predetermined diameter and length, said pin member having a diameter smaller than said second aperture means of said second jaw arm and said opening of said first end portion of said adjustment bolt means, receptacle means mounted in said second channel of said first jaw arm, said receptacle means for receiving said threading means of said adjustable bolt means, said eyelet portion of said adjustment bolt means is mounted in the second channel of said second jaw arms, said quick-release pin means engages said opening of said adjustment bolt means.

12. The apparatus of claim 6, wherein said jaws are mounted in said first gripper channels of said first jaw arm and said second gripper jaw arm.

13. The apparatus of claim 1, wherein each of said gripper jaws has a coil contact portion, said coil contact portion including a plurality of teeth therein for firmly gripping said coils when a pulling force is applied to said jaw member means.

* * * * *